(12) United States Patent
Colleoni et al.

(10) Patent No.: US 8,981,870 B2
(45) Date of Patent: Mar. 17, 2015

(54) DIFFERENTIAL COUPLER

(75) Inventors: Eric Colleoni, Monnaie (FR); Hilal Ezzeddine, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 300 days.

(21) Appl. No.: 13/571,739

(22) Filed: Aug. 10, 2012

(65) Prior Publication Data

US 2013/0038403 A1    Feb. 14, 2013

(30) Foreign Application Priority Data

Aug. 11, 2011    (FR) ...................... 11 57304

(51) Int. Cl.
| | | |
|---|---|---|
| H01P 5/12 | (2006.01) | |
| H01P 5/18 | (2006.01) | |
| H01P 5/10 | (2006.01) | |
| H01P 5/16 | (2006.01) | |
| H04L 25/02 | (2006.01) | |
| H03H 5/00 | (2006.01) | |
| H04B 3/30 | (2006.01) | |

(52) U.S. Cl.
CPC .. *H01P 5/10* (2013.01); *H01P 5/16* (2013.01); *H04B 3/30* (2013.01); *H04L 25/0272* (2013.01); *H01P 5/18* (2013.01)
USPC ................. 333/109; 333/25; 333/26; 333/113

(58) Field of Classification Search
CPC ............. H01P 5/16; H01P 5/18; H01P 5/227; H03H 7/48; H04B 3/30
USPC .......... 333/26, 109, 17.1, 24 R, 25, 113, 115, 333/116, 195, 204
See application file for complete search history.

(56) References Cited

U.S. PATENT DOCUMENTS

| | | | | |
|---|---|---|---|---|
| 5,363,071 | A  * | 11/1994 | Schwent et al. | 333/111 |
| 5,790,527 | A  * | 8/1998 | Janky et al. | 370/330 |
| 6,150,897 | A  * | 11/2000 | Nishikawa et al. | 333/26 |
| 7,250,828 | B2 * | 7/2007 | Erb | 333/26 |
| 8,653,904 | B2 * | 2/2014 | Endo | 333/25 |
| 2004/0130427 | A1* | 7/2004 | Ezzeddine | 336/222 |
| 2006/0208824 | A1* | 9/2006 | Erb | 333/26 |
| 2009/0128255 | A1* | 5/2009 | Dupont et al. | 333/109 |
| 2010/0328011 | A1* | 12/2010 | Ezzeddine | 336/200 |

FOREIGN PATENT DOCUMENTS

EP    1 703 582 A1    9/2006

OTHER PUBLICATIONS

French Search Report and Written Opinion dated Mar. 20, 2012 from corresponding French Application No. 11/57304.

* cited by examiner

*Primary Examiner* — Alexander H Taningco
*Assistant Examiner* — Rupert Wilmot-Dunbar, Jr.
(74) *Attorney, Agent, or Firm* — Allen, Dyer, Doppelt, Milbrath & Gilchrist, P.A.

(57) ABSTRACT

A distributed differential coupler, including a first conductive line and two second conductive lines coupled to the first one, each second conductive line including two conductive sections electrically in series, their respective junctions points being intended to be grounded.

8 Claims, 2 Drawing Sheets

DIFFERENTIAL COUPLER

CROSS REFERENCE TO RELATED APPLICATIONS

This application claims the priority benefit of French patent application number 11/57304, filed on Aug. 11, 2011, which is hereby incorporated by reference to the maximum extent allowable by law.

BACKGROUND

1. Technical Field

Embodiments generally relate to the electronics industry and, more specifically, to radio transceiver systems. Embodiments more specifically relate to a directional coupler.

2. Discussion of the Related Art

A coupler is generally used to recover part of the power present on a so-called main or primary transmission line to provide it to another so-called coupled or secondary line, located nearby. Couplers are divided in two categories according to whether they are formed of discrete passive components (it is then spoken of lumped element couplers) or of conductive lines close to one another to be coupled (it is then spoken of distributed couplers). The described embodiments relate to the second category of couplers. The ports of the main line are generally called IN (input) and OUT (output). The ports of the coupled line are generally designated as CPLD (coupled) and ISO (isolated).

In many applications, it is needed to sample part of the power transmitted over a line, for example, to control the power of an amplifier in a transmit system, to control the linearity of a transmit amplifier according to the loss associated with the reception of an antenna, to dynamically match an antenna, to set an impedance matching network, etc. A measurement of the amplitude (and sometimes of the phase) of the signals present on the terminals of the secondary line is used to sample this information.

The use of the information sampled from the secondary line of the coupler generally uses electronic circuits with differential signals. The use of differential signals improves the dynamics, especially for high frequencies (from several hundreds of megahertz to a few gigahertz) more specifically targeted by the present invention.

Converting common-mode signals into a differential signals generally requires specific circuits. In particular, to perform this conversion in the measurement circuit, active circuits connected to the CPLD and ISO terminals are often used.

However, active circuits increase the power consumption. This further increases the measurement circuit bulk.

SUMMARY

An object of an embodiment is to provide a novel directional coupler architecture overcoming all or part of the disadvantages of usual couplers.

Another object of an embodiment is to provide a differential coupler.

Another object of an embodiment is to provide a distributed coupler architecture.

To achieve all or part of these and other objects, an embodiment provides a distributed differential coupler, comprising a first conductive line; and two second conductive lines coupled to the first one, each second conductive line comprising two conductive sections electrically in series, their respective junctions points being intended to be grounded.

According to an embodiment, first ends of the second lines provide signals in phase opposition with signals provided by second ends of the second lines.

According to an embodiment, the signals provided by said first ends are in phase with each other, the signals provided by said second ends being in phase with each other.

According to an embodiment, the first line comprises four conductive sections electrically in series with two end terminals, each section being coupled to one of the sections of the second lines.

According to an embodiment, the phase points of the sections of the first line are directed towards a midpoint thereof, the phase points of the sections of the second lines being matched with those of the sections of the first line opposite to which they are respectively located.

According to an embodiment, the ends of the second lines are connected to attenuators.

According to an embodiment, the attenuators are sized according to the respective coupling coefficients between the first line and respective first and second sections of the second lines.

An embodiment provides a radio transceiver chain comprising a differential coupler such as hereabove.

The foregoing and other objects, features, and advantages will be discussed in detail in the following non-limiting description of specific embodiments in connection with the accompanying drawings.

DETAILED DESCRIPTION

Figure 1:
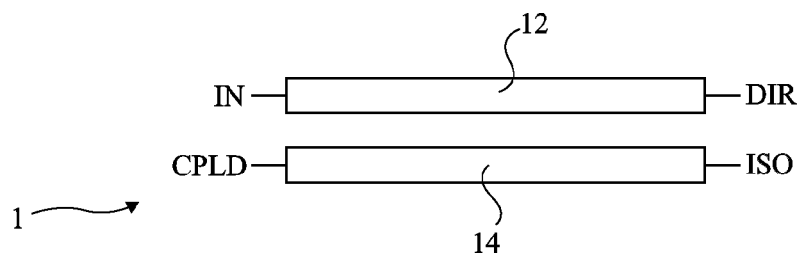
FIG. 1 is a simplified representation of a distributed coupler.

The same elements have been designated with the same reference numerals in the different drawings. For clarity, only those elements which are useful to the understanding of the described embodiments have been shown and will be discussed. In particular, the transceiver circuits connected upstream and downstream of the main coupler line have not been detailed, the described embodiments being compatible with usual applications of a coupler. Further, the use of the signals detected by means of the secondary line of the coupler has not been detailed either, the embodiments being here again compatible with usual applications.

FIG. 1 is a simplified representation of a distributed coupler 1. A main line 12 is intended to be interposed on a transmit line and comprises two respective input and output ports or terminals IN and OUT or DIR. A secondary line 14, coupled to the first one, comprises two ports or terminals, respectively CPLD and ISO, and is intended to convey information proportional to the signal conducted by line 12. Lines 12 and 14 are in practice formed of conductive tracks supported by an insulating substrate. The line lengths depend on the desired operating frequency and coupling level. Their width depends, among others, on the desired characteristic impedance.

The coupler of FIG. 1 is directional, since the signals present on ports CPLD and ISO do not have the same levels. Such a coupler is however symmetrical, which makes it bidirectional that is, in the same way as a signal applied to terminal IN is coupled on terminal CPLD, a signal applied to terminal DIR is coupled at the level of terminal ISO. In a directional symmetrical coupler such as illustrated in FIG. 1, the functions of the terminals are defined by the coupler connections to the other elements.

Figure 2:
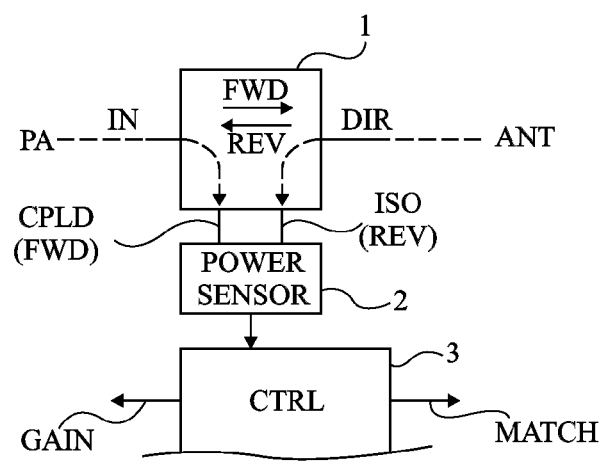
FIG. 2 partially shows an example of usual transceiver chain architecture.

FIG. 2 partially shows an example of use of a directional coupler such as illustrated in FIG. 1. The main line of coupler 1 is interposed on a transmission line between a power amplifier PA (not detailed) and an antenna ANT (not detailed). In the example of FIG. 2, terminal IN of the coupler is on the power amplifier side and terminal DIR is on the antenna side. The forward signals (FWD) conveyed, in transmit mode, from the amplifier to the antenna are capable of being reflected (REV) by the antenna. More generally, signals may return from the antenna to the transmit amplifier. It is useful to measure these signals to modify various parameters, for example, of impedance matching circuits, and thus improve the transmission.

Ports CPLD and ISO of coupler 1 are connected to input terminals of a sensor 2 (POWER SENSOR) having the function of exploiting the levels of the signals present on ports CPLD and ISO to detect the amplitude of the forward signal (FORWARD, FWD) and of the signal coming from the antenna (REVERSE, REV).

The results of the measurements performed by circuit 2 are used by a control circuit 3 (CTRL), typically a microcontroller or the like, which, for example, matches the gain (GAIN) of power amplifier PA and modifies the parameters of an impedance matching circuit (MATCH) on the antenna side. The operation of such a transmission chain is usual and will not be detailed any further.

In the circuit of FIG. 2, circuit 2 integrates elements for converting common-mode signals into differential signals to improve the detection.

It could be envisaged to transfer the change of mode to a passive circuit, by means of mode change transformers (generally called "baluns" in the art, for Balanced-Unbalanced) which may, like couplers, have lumped elements or be distributed. Ports CPLD and ISO of the coupler are then individually connected to the respective common-mode inputs of two baluns. The differential mode outputs of the baluns provide the differential measurements. Thus, the dynamics is improved and the power consumption and the cost of the active portion of the transmission chain are decreased. However, the presence of two baluns in addition to the coupler increases the size and the cost of the distributed circuit portion.

Figure 3:
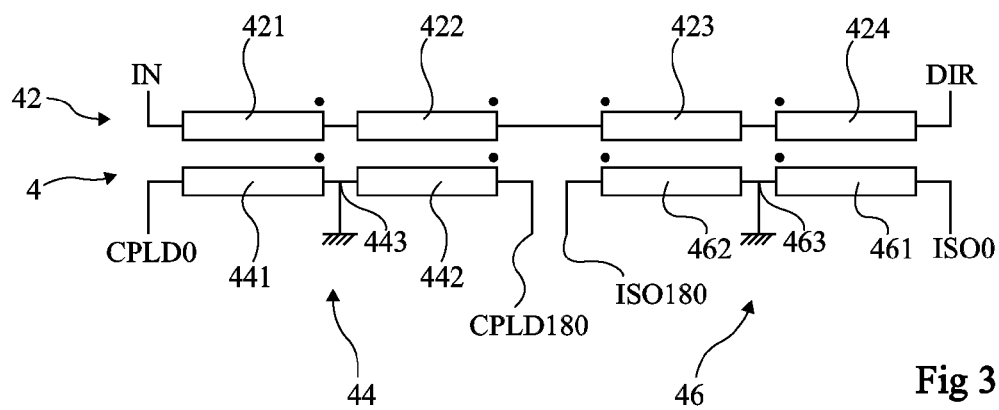
FIG. 3 shows an embodiment of a distributed differential coupler.

FIG. 3 schematically shows an embodiment of a differential coupler 4.

Coupler 4 comprises a first line or main line 42, formed of four conductive sections 421, 422, 423, and 424 electrically in series between terminals IN and DIR. It also comprises two second lines or secondary lines 44 and 46 each formed of two conductive sections 441, 442 and 462, 461 electrically in series. Each section is coupled to one of the four conductive sections 421 to 424 of the main line. Respective junction points 443 and 463 of sections 441, 442 and 462, 461 are intended to be grounded. The two ends of first secondary line 44 define two coupled ports CPLD0 and CPLD180 providing signals phase-shifted by 180 degrees with respect to each other. The two ends of second secondary line 46 define two terminals ISO180 and ISO0 providing signals phase-shifted by 180 degrees with respect to each other. Terminals CPLD0 and ISO0 provide a first differential output of coupler 4 with signals in phase with each other. Terminals CPLD180 and ISO180 provide a second differential output with signals in phase with each other.

FIG. 3 illustrates the phase points of the conductive lines. The position of these points defines, on the secondary line side, the terminals on which the signals respectively in phase) (0°) and in phase opposition (180°) with respect to the main line signals are found. In the example of FIG. 3, the phase points of lines 421 and 422 are on the side of terminal DIR and the phase points of lines 423 and 424 are on the side of terminal IN. In other words, the phase points are directed towards the middle of line 42. On the secondary line side, the phase point of each section 441, 442, 462, or 461 is on the same side as the phase point of section 421 to 424 with which it is coupled. In such a configuration, the signals in phase (terminals CPLD0 and ISO0) with the main line signals are on the side of terminals IN and DIR.

Preferably, attenuators (not shown in FIG. 3) are provided at the respective outputs of the secondary lines to compensate for a difference in coupling coefficients between sections.

Figure 4:
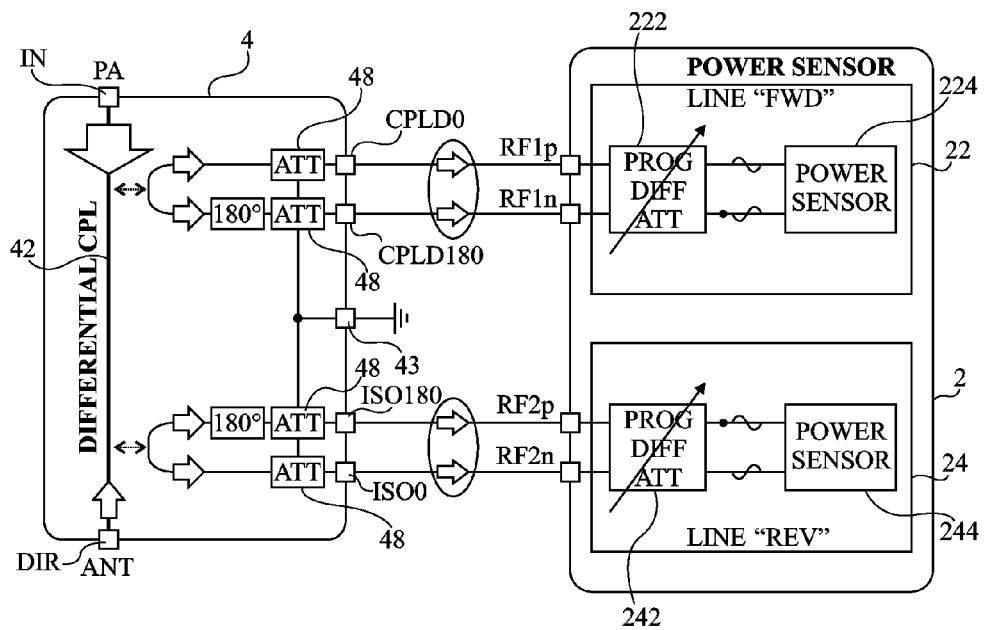
FIG. 4 very schematically shows in the form of blocks an embodiment of an architecture for exploiting the signals of the secondary line of a differential coupler such as illustrated in FIG. 3.

FIG. 4 shows, in the form of blocks, an example of connection of a differential coupler 4 such as illustrated in FIG. 3 to a measurement circuit 2 with differential inputs.

Main line 42 of the coupler is connected, by its two terminals IN and DIR, respectively on the side of power amplifier PA and of antenna ANT. In the example of FIG. 4, a coupler is assumed to be connected on the transmit chain side, terminal IN thus being on the side of amplifier PA. In a reception system, terminal IN is on the antenna side.

On the secondary line side, the presence of attenuators 48 (ATT) is assumed between the respective ends of the secondary lines and terminals CPLD0, CPLD180, ISO0, and ISO180. Respective junction points 443 and 463 are interconnected to a ground terminal 43. Terminals CPLD0 and CPLD180 are respectively connected to differential input terminals RF1$p$ and RF1$n$ intended for a circuit 22 for measuring the transmitted power (LINE "FWD"). Terminals ISO180 and ISO0 are respectively connected to differential input terminals RF2$p$ and RF2$n$ of a circuit 24 for measuring the reflected power (LINE "REV").

Figure 5:
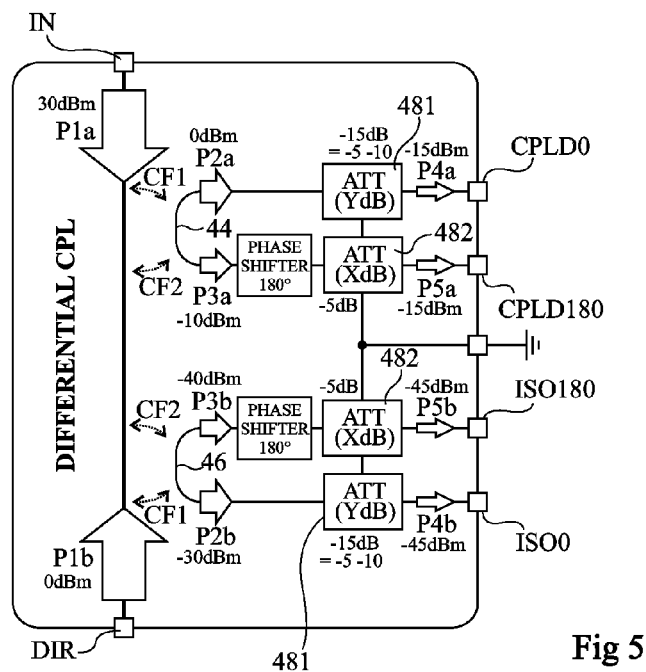
FIG. 5 illustrates the operation of the coupler of FIG. 3.

Due to the presence of attenuators 48 and as will be seen in relation with FIG. 5, the differential signals provided by terminals CPLD0 and CPLD180 may have the same amplitude. Similarly, the signals provided by terminals ISO180 and ISO0 may have the same amplitude.

Each power measurement circuit 22, 24 usually comprises a differential programmable attenuator, respectively 222, 242, in series with a power sensor, respectively 224 and 244. Circuit 2 of course receives power supply signals (not shown) and provides results to circuits, not shown, for using the measurements, for example, in order to set the transmit amplifier gain and to match the impedance on the antenna side.

FIG. 5 illustrates an example of sizing of attenuators 48 in coupler 4 according to the powers desired on the side of terminals ISO and CPLD to obtain equal amplitudes on respective terminals CPLD0, CPLD180 and ISO0, ISO180.

The main parameters of a coupler are:
- the insertion loss, which represents the transmission loss between the two ports of the main line (the insertion loss is then defined while the two other ports of the coupler are loaded with a 50-Ω impedance);
- the coupling, which corresponds to the transmission loss between ports IN and CPLD (the coupling is then defined while the two other ports DIR and ISO are loaded with a 50-ohm impedance);

the isolation, which corresponds to the transmission loss between ports IN and ISO (the isolation is defined while the two other ports DIR and CPLD are loaded with a 50-ohm impedance);

the directivity, which corresponds to the transmission loss difference between ports ISO and CPLD, from port IN. The directivity thus corresponds to the power difference (expressed in dB) between the two ports of the coupled or secondary line, of same phase in the shown differential coupler.

The differential coupler features two different coupling coefficients CF1 and CF2, respectively for the signals provided by terminals CPLD0 and ISO0 and for the signals provided by terminals CPLD180 and ISO180. The fact for the coupling coefficients to be different requires the preferred use of attenuators to rebalance powers and to provide the measurement circuit with identical levels for ports CPLD and identical levels for ports ISO. As a variation, it may be provided to transfer the attenuators on the measurement exploitation circuit side (for example, upstream of attenuators 222 and 242).

In the example of FIG. 5, a coupling coefficient CF1 of −30 dB between the main line and sections 441 and 461 and a coupling coefficient CF2 of −40 dB between the main line and sections 442 and 462 are arbitrarily assumed.

It is assumed that:
the coupler receives a signal to be transmitted on terminal IN with a level P1$a$ of 30 dBm;
level P1$b$ of the signal reflected by the antenna is 0 dBm; and
the coupler has a 30-dB directivity.

This provides, at the respective ends in phase and with a phase shift of line 44, powers P2$a$ and P3$a$ of 0 dBm and −10 dBm. On the side of line 46, powers P2$b$ and P3$b$ of −30 dBm and −40 dBm can be found, respectively at the ends in phase and with a phase shift. The blocks designated as PHASE SHIFTER 180° in FIG. 5 are, like in FIG. 4, merely indicative of the phase shift introduced by the lines, but represent no specific circuit.

Note Y and X the attenuations in dB respectively introduced by attenuators 481 intended for the signals in phase and 482 intended for the signals phase shifted by 180°.

Attenuations X and Y can be deduced from coupling coefficients CF1 and CF2 as well as from a possible common attenuation ATT. Coupling coefficient CF1 being assumed to be greater than coupling coefficient CF2, attenuation X corresponds to attenuation ATT. Attenuation Y then corresponds to this common attenuation ATT, minus the difference (CF1−CF2) between coefficients CF1 and CF2 to compensate for this difference at the level of the attenuators.

In the shown example, assuming a common attenuation X=ATT of −5 dB, attenuation Y is selected to produce −15 dB. Power P4$a$ and P5$a$ respectively provided on ports CPLD0, CPLD180 are then identical and equal −15 dBm. Powers P5$b$ and P4$b$ respectively provided on ports ISO0, ISO180 are then identical and equal to −45 dBm.

Other values than those taken as an example in relation with FIG. 5 may be used according to the directivity and coupling characteristics of the formed differential coupler.

A differential coupler such as illustrated hereabove may be made in distributed fashion, for example, by forming conductive windings to form the different sections of the main and secondary lines while ascertaining to respect the winding directions to obtain the desired phase points.

Various embodiments have been described. Various alterations, modifications, and improvements will occur to those skilled in the art. In particular, the dimensions to be given to the conductive lines depend on the application and are within the abilities of those skilled in the art based on the functional indications given hereabove as well as on the sizing of the attenuators.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A distributed differential coupler, comprising:
   a first conductive line comprising a plurality of conductive sections connected in series; and
   two second conductive lines coupled to the first conductive line, each second conductive line comprising two conductive sections electrically in series, wherein their respective junction points are grounded and each conductive section of the first conductive line being coupled with a respective one of the conductive sections of the two second conductive lines.

2. The coupler of claim 1, wherein first ends of the second lines provide signals in phase opposition with signals provided by second ends of the second lines.

3. The coupler of claim 2, wherein the signals provided by said first ends are in phase with each other, the signals provided by said second ends being in phase with each other.

4. The coupler of claim 1, wherein the first line comprises four conductive sections electrically in series between two end terminals, each section being coupled with one of the sections of the second lines.

5. The coupler of claim 4, wherein the phase points of the sections of the first line are directed towards a midpoint thereof, the phase points of the sections of the second lines being matched with those of the sections of the first line opposite to which they are respectively located.

6. The coupler of claim 1, wherein the ends of the second lines are connected to attenuators.

7. The coupler of claim 6, wherein the attenuators are sized according to the respective coupling coefficients between the first line and respective first and second sections of the second lines.

8. A radio transceiver chain comprising the differential coupler of claim 1.

* * * * *